Nov. 17, 1953

P. MERCIER 2,659,458

HIGH-POWER WHEEL BRAKE, ESPECIALLY FOR AIRCRAFT

Filed May 19, 1950

Inventor
Pierre Mercier

Nov. 17, 1953 P. MERCIER 2,659,458
HIGH-POWER WHEEL BRAKE, ESPECIALLY FOR AIRCRAFT
Filed May 19, 1950 3 Sheets-Sheet 2
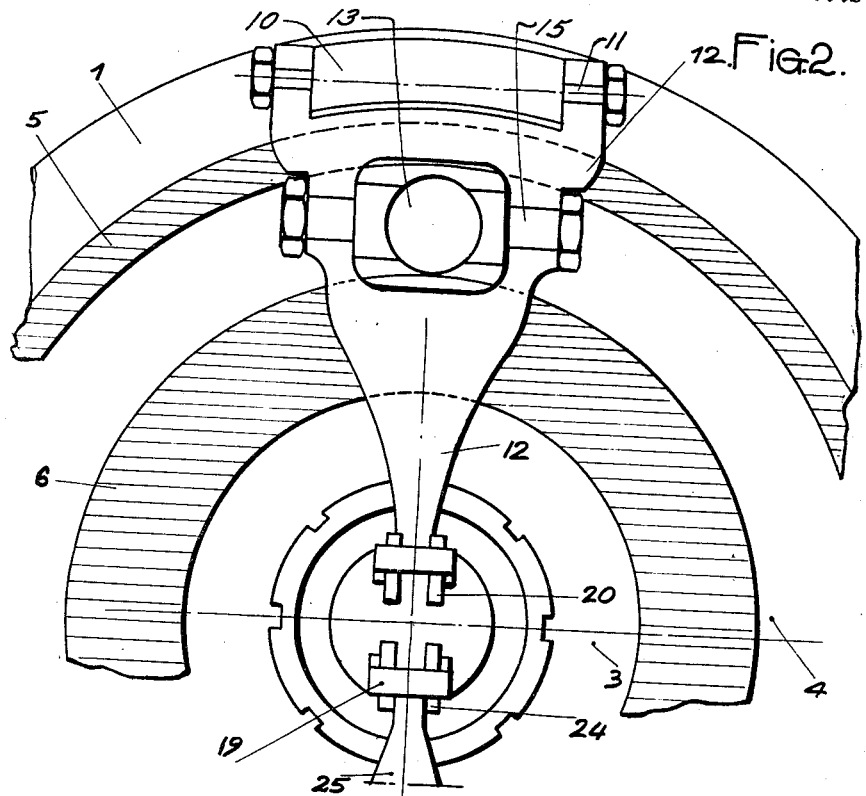
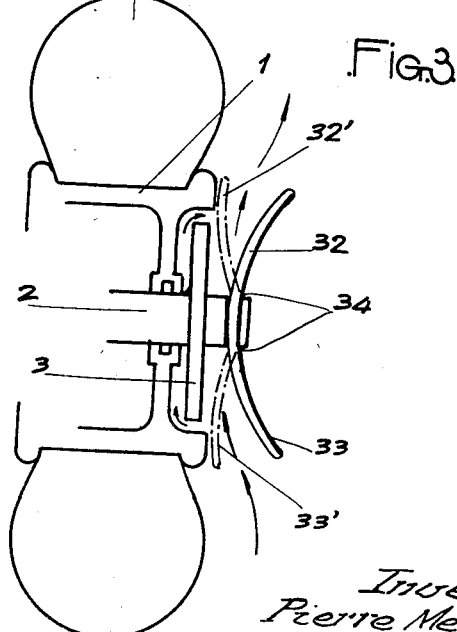
Inventor
Pierre Mercier
by
Atty

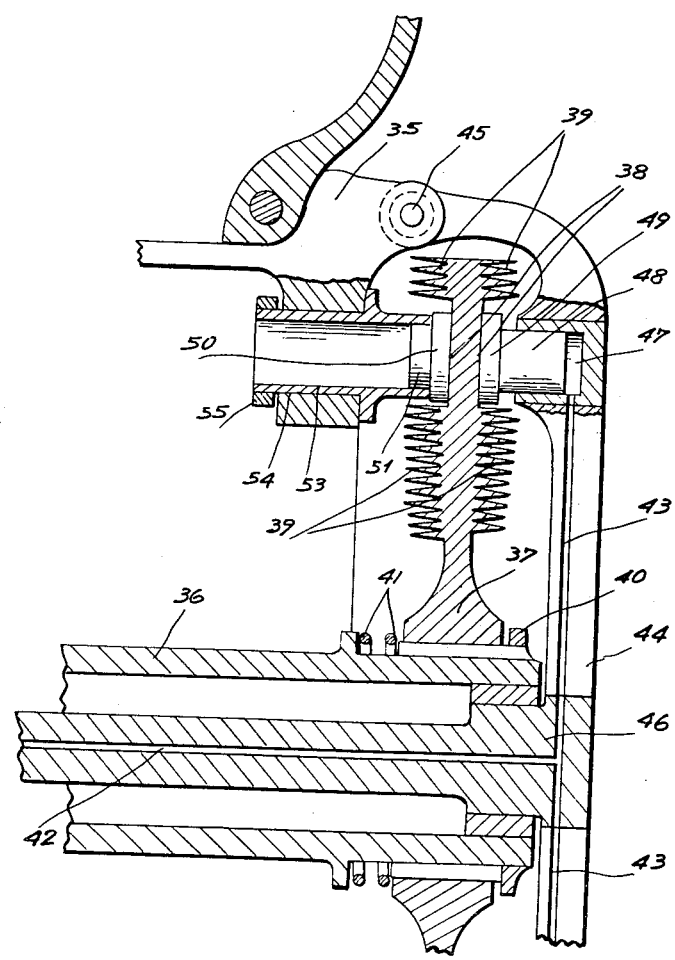

Patented Nov. 17, 1953

2,659,458

UNITED STATES PATENT OFFICE 2,659,458

HIGH-POWER WHEEL BRAKE, ESPECIALLY FOR AIRCRAFT

Pierre Mercier, Gennevilliers, France, assignor to Societe d'Etudes et de Constructions Aero-Navales, Gennevilliers, France, a company of France Application May 19, 1950, Serial No. 162,845
Claims priority, application France May 21, 1949

3 Claims. (Cl. 188—72)

Wheel brakes should offer a high braking torque, a large power absorption capacity, a low weight and a high regularity of the braking torque.

In aircraft, in particular, the three first qualities are very important.

The object of the present invention is a disc type wheel brake offering these features.

According to the invention, the wheel hub carries a friction disc incapable of rotating, and a control device acting on two levers articulated on two diametrically opposite axes of the wheel, said levers offering each a friction fitting which is pressed against the disc which may be applied against two other friction fittings mounted fixedly in the wheel, so that when the levers are pulled towards the inside of the hub, the braking disc is clamped between two pairs of friction fittings. The disc is preferably provided with fins which increase its thermal exchange power. Thus the elimination of heat by convection and radiation is important; further, the increase of the specific heat as a function of temperature is utilized in the best possible manner.

The friction fittings are driven by the rotation of the wheel to be braked and the necessary pressure stress is supplied by a central control element placed inside the hub, so as to facilitate dismantling and eliminate rotating joints in the case of an hydraulic control.

Various other features of the invention will appear from the following detailed description.

Figure 2 is an elevation, in part, of the right hand side of Figure 1.

Figure 3 is a schematic transverse vertical section of a complete wheel provided with the brake according to the invention.

Figure 4 is a transverse vertical section, in part, of a modified embodiment.

Figure 1:
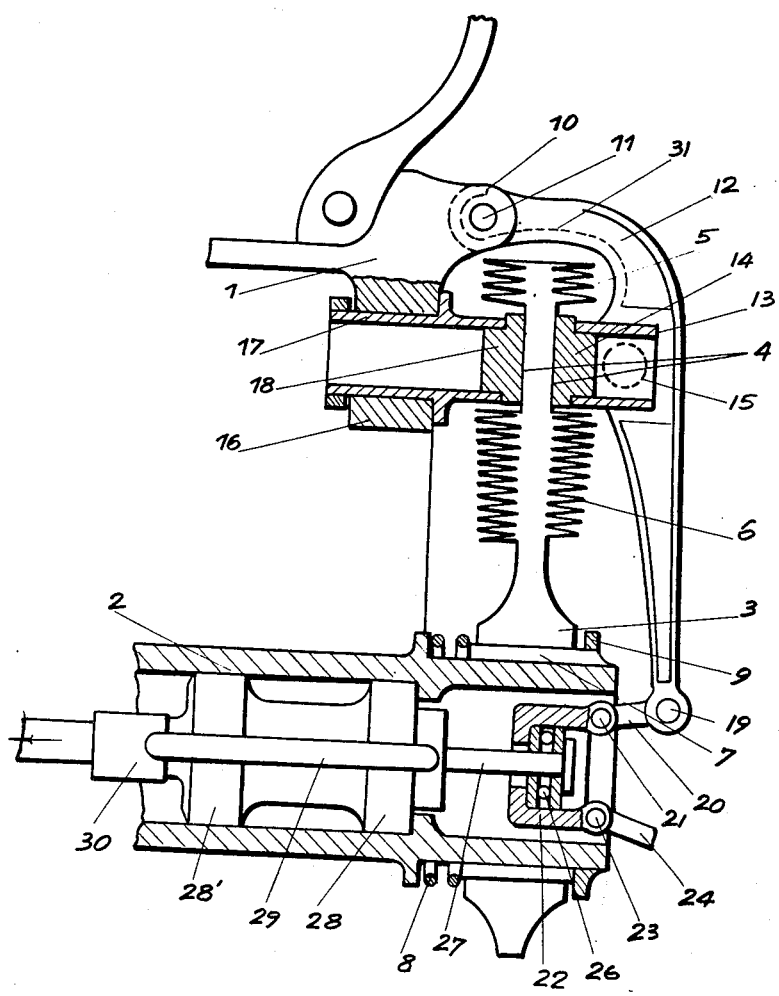
Figure 1 is a transverse vertical section, in part, of a wheel equipped with a brake according to the invention.

I is the wheel rim, 2 its stub axle; the latter does not rotate; 3 is a brake disc keyed on the hub 2 so that it cannot rotate with respect to the latter; 4 are the friction tracks of disc 3. Fins 5, 6 are formed on disc 3 on both sides of the friction tracks 4. As shown in Figure 2, said fins are oriented so as to be substantially parallel with the relative wind, so as to ensure an optimum cooling. The thickness and depth of the fins may be varied, as well as the cross section of solid metal at their bases, to ensure a suitable evacuation of heat and as high a uniformity as possible of the temperature.

The brake disc 3 is mounted on the stub axle 2 by means of splines 7, allowing it a certain amount of play along the axis of the stub axle. A spring 8 tends to push this disc away and to press it against a stop 9.

A boss 10 is provided on the rim 1 and carries an axle 11, firmly imbedded, about which pivots a lever 12. A socket 13, accommodating a friction wafer 14 is articulated by means of an axle 15 in the lever 12. The rim 1 comprises, in the boss 16 another socket 17 also accommodating a friction wafer 18. An axle 19, fixed at the end of lever 12 is connected through a connecting rod 20 with an axle 21 of the housing 22. Said housing 22 comprises a second axle 23, connected through a connecting rod 24 with a second lever 25 (Figure 2), corresponding to lever 12 and arranged on the same diameter as the latter. The housing 22 contains a ball stop 26, preferably with a ball and socket mounting, which, through a rod 27 receives the stress from the driving element.

This driving element, in the example shown, consists of a hydraulic jack comprising a double piston 28, 28', provided with a supply pipe 29, 30.

A spring 31, for instance a blade type spring, tends to move the lever 12 away from the rim 1.

A streamlining housing 32, 33, the elements of which are articulated at 34 on the end of the stub axle 2, is brought to the position 32', 33', during flight, so as to deflect the air lines as shown by the arrows; this streamlining housing is brought to the position shown in solid lines when the landing train is out.

The brake operates as follows:

In the absence of any control stress, the spring 8 pushes the disc 3 outside and the spring 31 pushes away the lever 12, so that the wafers 14, 18 are not in contact with the friction surfaces 4. As soon as a stress is exerted from right to left on rod 27, in Figure 1, the two wafers 14 and 18 are simultaneously placed under pressure and come and press on the friction surfaces 4, which causes the braking. The heat evolved heats up the disc and the calories developed are absorbed:

(a) By the thermal mass of the disc due to the temperature rise and its specific heat;

(b) By the convection resulting from the large contact surface of the disc and ambiant air, due to the fins and to the relatively high speed of the air owing to the orientation of said fins.

(c) By radiation due to the high temperatures reached and to the large contact surface of the fins and air.

The evacuation of the heat resulting from the last two factors is important due to the fact that the brake operates at a high temperature, which supposes that the materials of which the disc 3 and the wafers 14, 18 are made, are selected so as to be able to stand high pressures and high temperatures.

The disc may be made of steel or refractory bronze. As to the wafers, sintered alloys, containing graphite, particularly, may be used, which ensure automatically a lubrication at high temperatures.

Several modifications may be made to the example of embodiment represented and described within the scope of the invention. In particular, instead of using a hydraulic jack for the control, a pneumatic, mechanical or electrical device may be provided, ensuring the driving of the rod 27.

The wafers 14 and 18 may be mounted on ball and socket joints so as to ensure a perfect bearing on the friction surfaces 4, even in case the disc 3 is slightly out of shape. The center of the ball and socket joint will preferably be placed in the vicinity of the friction plane. The use of a ball and socket ball stop 21 makes it possible to compensate for a possible warping of the disc.

The rod 27 may be provided with a length adjustment making it possible to take up the overall wear of the wafers 14, 18 and friction surfaces 4. The connecting rods 20, 24 may also have an adjustable length to make up differences due to wear between the two groups of diametrically opposite wafers.

A streamlining housing may also be provided, increasing the mass and speed of the air circulating around the disc. This streamlining housing, at its entrance, may comprise a grating preventing foreign bodies from damaging the mechanism. The streamlining housing 32, 33, shown, by way of example, on Figure 3 makes it possible to house part of the brake inside the thickness of the wheel so as to decrease the thickness of the latter. To this effect, it is necessarily movable and its motion is controlled by the releasing of the landing train, by means of a suitable device.

It should be noted that the wheel may be dismantled without disconnecting the control element which is placed inside the hub, which is particularly useful when the latter is a hydraulic jack. It is sufficient, to disassemble the two axles 19 to allow the removal of the wheel assembly, while the jack and housing 22 remain on the frame to which the wheel is secured.

In the modification of Figure 4, 35 is the rim of the wheel and 36 its stub axle; the latter not rotating; the brake disc 37, keyed on the hub 36, therefore, cannot rotate with respect to the latter. 38 are the friction tracks of the disc 37. Fins 39 are formed on both sides of the friction tracks 38.

The disc 37 is mounted on splines of the hub 36 between an outer stop 40 and a coil spring 41. This mounting allows it a certain amount of play along the axis of the stub axle, the spring 41 tending to press the disc 37 against the stop 40. A duct 42 is provided inside the stub axle 36, this duct being extended by a second duct 43, perpendicular, in the plane of the figure, to the former one. The duct 43 is arranged through a support 44 secured at its two ends to the rim 35 by pins 45. 46 is a revolving sealing joint. The duct 43 opens, at its two ends, inside a chamber 47 in which a piston 48 can slide, carrying a wafer 49 at its end towards the disc 37. A second wafer 50, comprising a tail piece 51 is held by a support 52 housed in a hole of the rim 35, held in position, itself, by a collar 55.

The brake operates as follows:

In the absence of any control stress, the spring 41 tends to push the disc 37 towards the stop 40, the wafer 49 being at rest, the two friction surfaces of the disc 37 are disengaged, the wheel can rotate freely. As soon as fluid under pressure is sent in the ducts 42, 43, said fluid pushes the piston 48 towards the left in the figure; the disc 37 is thus also displaced towards the left against the action of the spring 41 until the left surface of the disc bears against the wafer 50; from then on, the wafers press against the friction surfaces 38, which causes a braking. The heat evolved heats up the disc and the calories developed are absorbed as previously stated.

Other modifications can be made to the example described within the scope of the invention.

What I claim is:

1. A wheel and brake assembly comprising, a fixed axle, a wheel journalled on said axle, a brake disc splined on said axle adjacent said wheel and slidable axially thereof, a stop on said axle to limit movement of said disc from said wheel, spring means on said axle and biasing said disc toward said stop, circular brake surfaces on opposite sides of said disc, brake shoes carried by said wheel for engagement with the circular brake surface on the adjacent side of said disc, support means carried by said wheel and extending around the periphery of said disc, brake shoes movably carried by said support means for engagement with the circular brake surface on the side of said disc opposite said wheel, and means for moving said latter shoes to engage said disc and press it against said wheel carried shoes.

2. An assembly as defined in claim 1 wherein cooling fins are formed on the side of said disc and extend rectilinearly in a direction substantially parallel with the direction of movement of said axle.

3. A wheel and brake assembly comprising, a fixed axle, a wheel journalled on said axle, a brake disc splined on said axle adjacent said wheel and slidable axially thereof, a stop on said axle to limit movement of said disc from said wheel, spring means on said axle and biasing said disc toward said stop, circular brake surfaces on opposite sides of said disc, brake shoes carried by said wheel for engagement with the circular brake surface on the adjacent side of said disc, support means carried by said wheel and extending around the periphery of said disc to said axle, a rotatable fluid seal between said support means and said axle, cylinders in said support means, brake shoes including pistons slidable in said cylinders for engagement with the circular brake surface on the side of said disc opposite said wheel, fluid passage means in said axle and opening at said rotatable seal, and fluid passages in said support means between said rotatable seal and said cylinders for supplying fluid from the axle passage means to said cylinders to actuate said pistons for moving said piston carried shoes to engage said disc and press it against said wheel carried shoes.

PIERRE MERCIER.

References Cited in the file of this patent

UNITED STATES PATENTS

| Number | Name | Date |
| --- | --- | --- |
| 1,473,366 | Walther | Nov. 6, 1926 |
| 1,869,479 | Hofer | Aug. 2, 1932 |
| 2,068,956 | La Brie | Jan. 26, 1937 |
| 2,153,372 | Hyde | Apr. 4, 1939 |

FOREIGN PATENTS

| Number | Country | Date |
| --- | --- | --- |
| 274,144 | Great Britain | July 20, 1927 |
| 510,037 | Great Britain | July 26, 1939 |
| 321,479 | Italy | Oct. 6, 1934 |